US009527342B2

(12) United States Patent
Clark, II (10) Patent No.: US 9,527,342 B2
(45) Date of Patent: *Dec. 27, 2016

(54) SPINNER FOR VEHICLE WHEEL

(71) Applicant: Michael Todd Clark, II, Lake Saint Louis, MO (US)

(72) Inventor: Michael Todd Clark, II, Lake Saint Louis, MO (US)

(*) Notice: Subject to any disclaimer, the term of this patent is extended or adjusted under 35 U.S.C. 154(b) by 86 days.

This patent is subject to a terminal disclaimer.

(21) Appl. No.: 14/508,540

(22) Filed: Oct. 7, 2014

(65) Prior Publication Data

US 2015/0021975 A1    Jan. 22, 2015

Related U.S. Application Data

(63) Continuation-in-part of application No. 13/385,482, filed on Feb. 22, 2012, now Pat. No. 8,882,205.

(51) Int. Cl.
*B60B 7/20* (2006.01)
*B60B 7/04* (2006.01)
*B60B 7/00* (2006.01)
*B60B 7/06* (2006.01)

(52) U.S. Cl.
CPC ............... *B60B 7/20* (2013.01); *B60B 7/0006* (2013.01); *B60B 7/006* (2013.01); *B60B 7/008* (2013.01); *B60B 7/04* (2013.01); *B60B 7/063* (2013.01); *B60B 2900/572* (2013.01)

(58) Field of Classification Search
CPC .......... B60B 7/04; B60B 7/0006; B60B 7/008; B60B 7/063; B60B 7/20
USPC ....... 301/37.102, 37.25, 37.106, 301/37.108, 301/37.109; 40/587
See application file for complete search history.

(56) References Cited

U.S. PATENT DOCUMENTS

| 3,158,946 A | 12/1964 | Upchurch |
| 3,219,391 A | 11/1965 | Hetinger |
| 3,722,958 A | 3/1973 | Marshall |
| 5,290,094 A | 3/1994 | Dragg |
| 5,659,989 A | 8/1997 | Hsiao et al. |
| 6,309,027 B1 | 10/2001 | Smith |
| 6,554,370 B2 | 4/2003 | Fowlkes |
| 6,575,537 B1 | 6/2003 | Wang |
| 6,637,830 B1 | 10/2003 | Burgess |
| 6,655,061 B1 | 12/2003 | Good |
| 6,663,187 B2 | 12/2003 | Fitzgerald |

(Continued)

FOREIGN PATENT DOCUMENTS

KR    WO 0076787 A1 * 12/2000 ............... B60B 7/20

*Primary Examiner* — Kip T Kotter
(74) *Attorney, Agent, or Firm* — Mitchell Intellectual Property Law, PLLC (57) ABSTRACT

A vehicle wheel spinning device comprising a ring shaped housing having a front and back ring forming a cavity therein is disclosed. The front ring has a series of decorative apertures formed therein. A spinning ring is rotatably mounted within said cavity. Various visual effects are produced by providing on the surface of the spinning ring facing the front ring of said housing at least one section of a contrasting color to the remainder of the surface. When the spinning ring rotates the colors show through said apertures during rotation of the spinning ring. The spinning device is attached to the front of a vehicle wheel in a manner that the housing rotates with the wheel and the spinning ring rotates separately from the rotation of the housing and continues to rotate for a time after the wheel stops rotating.

15 Claims, 11 Drawing Sheets

(56) References Cited

U.S. PATENT DOCUMENTS

| | | |
|---|---|---|
| 6,702,396 B1 | 3/2004 | Wang |
| 6,942,303 B2 | 9/2005 | Smith et al. |
| 6,945,609 B2 | 9/2005 | Barney |
| 7,014,273 B1 | 3/2006 | Yang et al. |
| 7,100,995 B2 | 9/2006 | Gilly et al. |
| 7,121,631 B2 | 10/2006 | Strzelczyk |
| 7,182,408 B2 | 2/2007 | Rivers, Jr. et al. |
| 7,354,113 B2 | 4/2008 | Marriott |
| 2004/0183359 A1 | 9/2004 | Fowlkes |
| 2006/0220440 A1 | 10/2006 | Treacy |

* cited by examiner

SPINNER FOR VEHICLE WHEEL

RELATED APPLICATIONS

This application is a continuation-in-part of application Ser. No. 13/385,482 filed on Feb. 22, 2012, now U.S. Pat. No. 8,882,205 B2, which relates to and claims priority to U.S. Provisional Application Ser. No. 61/464,275 entitled "SPINNER FOR VEHICLE WHEEL" filed March, 2011, both of which are herein incorporated by reference in their entirety.

TECHNICAL FIELD

The invention generally pertains to a wheel spinner device for attachment to a vehicle wheel that contains a spinner that spins independently of the wheel itself.

BACKGROUND OF THE INVENTION

It has been reported in the literature that the original free-spinning spinner was made in the 1980s. However, revolving wheel disc covers were previously reported in U.S. Pat. Nos. 3,158,846 and 3,219,391. Examples of other wheel spinners have been disclosed in U.S. Pat. Nos. 6,554,370; 6,655,061; 6,945,609; 7,014,273; 7,100,995; 7,121,631 and 7,182,408. None of these patents teach or suggest the novel wheel spinner taught and claimed herein.

Wheel spinners have been used on vehicles such as automobiles, SUVs, motorcycles and trucks to provide a novel visual effect of a part spinning at different speeds than the wheel and to continue to spin when the vehicle has stopped.

The development of wheel spinners has primarily focused on a spinner device attached to a vehicle wheel (rim) that rotates at a different speed than the wheel and continues to rotate when the vehicle stops. Most of these spinners have one common feature; they attach to the center of the rim and rotate essentially within the area of the rim itself. The spinner portion is usually a non-enclosed spinning blade or spokes that can cause a danger to anyone, especially small children, who may place his or her finger into the wheel while it is still spinning. Also the spinners are limited to spinning spokes or blades with no ability to show motion that is created by color changes. Finally the spinning elements are open to the environment and thus, salt ice, packed snow and the like can affect the performance of the spinner. Lastly the spinner is located in the center of the wheel and does not hide at least a portion of the tire. An object of the present invention is to provide a novel aesthetic effect through the use of unique spinner device and color changes. Another object is to improve upon the negative features of prior spinners.

SUMMARY OF THE INVENTION

A spinning device for a vehicle wheel is disclosed comprising: a housing having a front and back ring forming a cavity therein, the front ring containing at least one decorative aperture formed therein; a spinning ring mounted within the cavity of the housing in a manner that the spinning ring rotates upon rotation of the wheel and continues to rotate for a time after the wheel stops, said surface of the spinning ring facing the front ring of said housing having one section of a contrasting color to the remainder of the spinning ring such that when it rotates within the cavity the color showing through said aperture changes during rotation of the spinning ring. The housing is attached to the front of the vehicle wheel in a manner that the housing rotates with the wheel and the spinning ring rotates separately from the rotation of the housing and continues to rotate for a time after the wheel stops rotating. Ring as used herein means a circular plate optionally having a centrally located hole.

In one embodiment a donut shaped spinning device for a vehicle wheel is disclosed comprising: a donut shaped housing having front and back ring forming a cavity therein, the front ring containing at least one decorative aperture formed therein; a spinning ring mounted within the cavity of the housing in a manner that the spinning ring rotates upon rotation of the wheel and continues to rotate for a time after the wheel stops, said surface of the spinning ring facing the front ring of said housing having one section of a contrasting color to the remainder of the spinning ring such that when it rotates the color showing through said aperture change during rotation of the spinning ring, and means for attaching the housing to the vehicle wheel in a manner that the housing rotates with the wheel and the spinning ring rotates separately from the rotation of the housing and continues to rotates for a time after the wheel stops rotating.

The primary object of the invention is to improve on the known spinners by providing a donut shaped wheel spinning device 10, comprising housing 11 that encloses in its cavity a freely rotatable flat spinning ring 12 having at least one contrasting color portion 13 on the front surface.

The face of the housing includes apertures 14 extending through a least a portion of the face. The spinning device can be constructed for example by assembling three flat rings: a front ring 15 that has a series of apertures 14 of various design such that when the internal spinning flat ring 12 rotates it forms a visual effect caused by the contrasting colored portion 13 passing by the open design of the front ring: a back ring 16; two spacers, an inner spacer 17 and an outer spacer 18 interposed between the front and the back rings; and positioned in the housing 11 formed by the front and back rings and the two spacers the freely rotating flat spinning ring 12. When assembled the front and back rings along with the spacers form the housing 11 in which the spinning flat ring 12 is rotatably mounted. The assembled spinning device 10 is attached to the wheel 31 of an automobile, motorcycle, truck and the like in any suitable manner such as by torsion bolts, clips and the like. The inner circumference of spinning flat ring 12 sits on bearings 19 and is urged into rotation when the wheel turns and continues to spin when the wheel stops rotating thus continuing the visual effect. Since the housing is attached to the wheel the housing rotates with the wheel and stops when the wheel stops.

The spinning device may, in one embodiment, be sealed to the environment so that weather conditions do not affect its performance.

In another embodiment the spinning device hides at least a portion of the tire.

In another embodiment at least the front ring comprises a flat plate containing decorative apertures 14 and is free of the centrally located hole 50 of the donut shaped housing shown in FIGS. 1, 2, 3 and 4.

These and other objects and advantages of the present invention will become apparent from the subsequent detailed description of the embodiments and the appended claims taken in conjunction with the accompanying drawings. It should be kept in mind that the following description will teach various embodiments of the invention but the invention is not so limited.

BRIEF DESCRIPTION OF THE DRAWINGS

The corresponding numbers in the different views refer to the same part. Only an illustrative view of the fasteners is shown. In order to more clearly illustrate the fitting and association of the parts they are not necessarily drawn to scale.

DETAILED DESCRIPTION OF THE INVENTION

One variation of the spinning device shown in FIGS. 1-4 comprises a donut shaped spinning device for a vehicle wheel comprising: a donut shaped housing 11 having a front ring 15 and a back ring 16 forming a cavity therein, the front ring containing at least one decorative aperture 14 formed therein; a spinning ring 12 mounted within the cavity of the housing in a manner that the spinning ring rotates upon rotation of the wheel 31 and continues to rotate for a time after the wheel stops, said surface of the spinning ring facing the front ring of said housing having one section 13 of a contrasting color to the remainder of the spinning ring such that when it rotates the colors showing through said aperture(s) change during rotation of the spinning ring, and means for attaching the housing to the vehicle wheel in a manner that the housing rotates with the wheel and the spinning ring rotates separately from the rotation of the housing and continues to rotate for a time after the wheel stops rotating. In this embodiment the three rings each have a central opening hole 50 that permits a view of at least a portion of the wheel 31. In this embodiment, for example, lug nuts can be exposed and the wheel can be removed from and attached to the hub assembly without removing the spinning device from the wheel. Moreover the device can be attached to the outside of wheels that contain an axle that mounts on a fork such as used on motorcycles to mount and attach the wheels of the motorcycle. The donut shape having the opening hole 50 in the center permits the axle to extend through the mounted device. In another variation shown in FIGS. 5, 5A and 6 the front ring is a closed plate (disk) except for the apertures 114 and optionally holes used to permit attaching the front ring to the back ring and the housing to the front of a wheel. If desired the spinning ring or the back ring or both can also be free of a centrally located hole 50. The spinning device 10, comprises ring shaped housing 11 that encloses in its cavity a freely rotatable flat spinning ring 12 having at least one contrasting color portion 13 on the front surface thereof.

Figure 3:
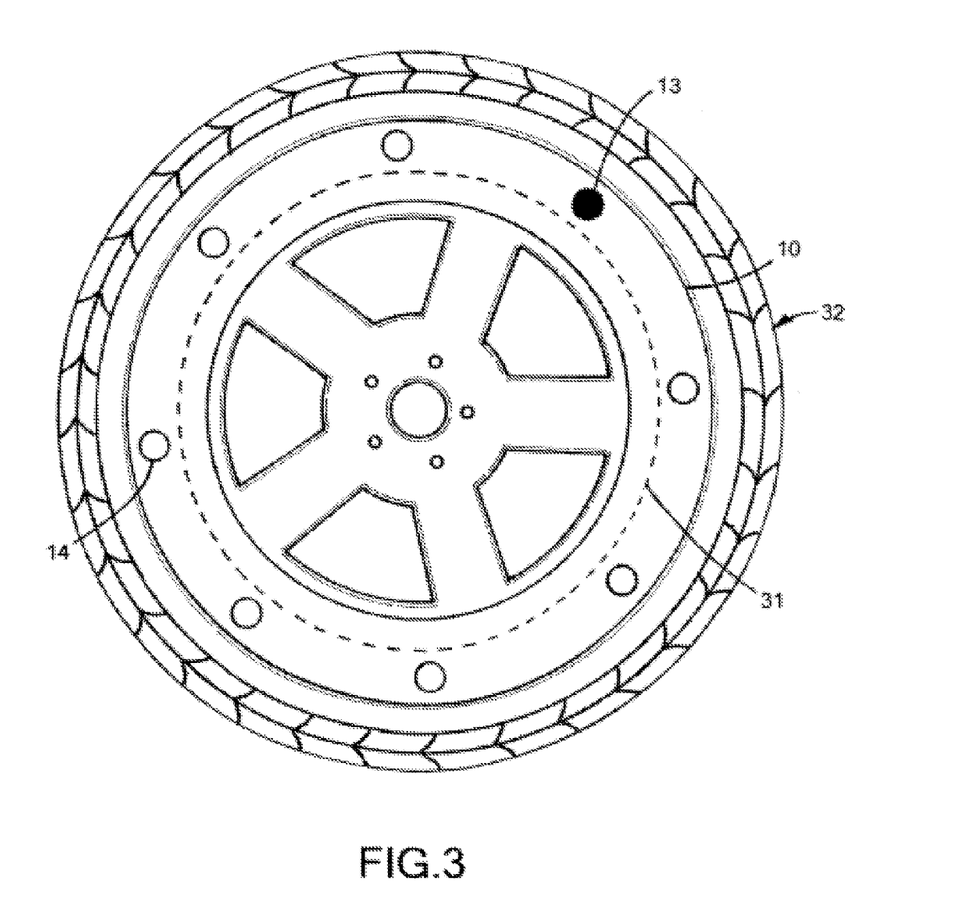
FIG. 3 is front view of the spinning device 10 attached to a rim and partially hiding a tire 32 and leaving an open view of a majority of the wheel 31. The dashed line depicts the outer circumference of the rim.
Figure 4:
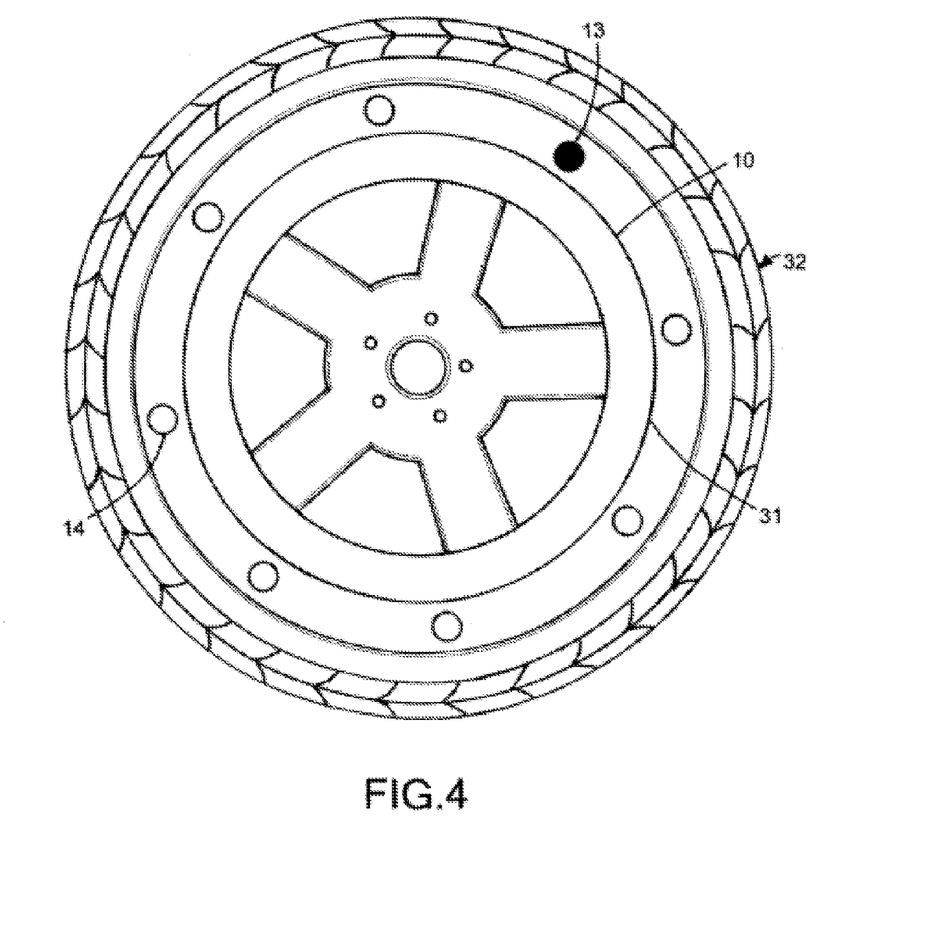
FIG. 4 is a front view of another embodiment where the spinning device has an outer circumference approximately the same size as the outer circumference of the rim and an inner circumference of a size that hides at least a portion of the rim.
Figure 5:
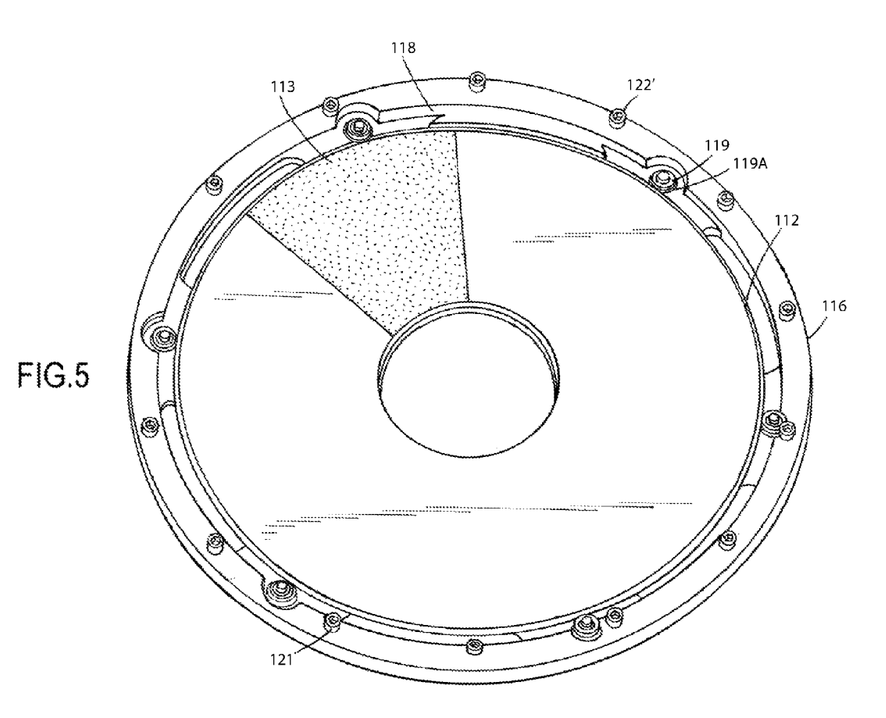
FIG. 5 is a front view of another embodiment of the spinning device wherein a front plate (disk) 115, shown in FIG. 5A, includes decorative apertures 114 and is free of the central hole 50 illustrated in FIGS. 1 and 2 and the spinning ring 112 with contrasting colored portion 113 is mounted inside the housing 11 on bearings 119 having groove 119A which rotatably hold the spinning ring 112 on the outer peripheral circumference of the spinning ring 112.
Figure 5A:
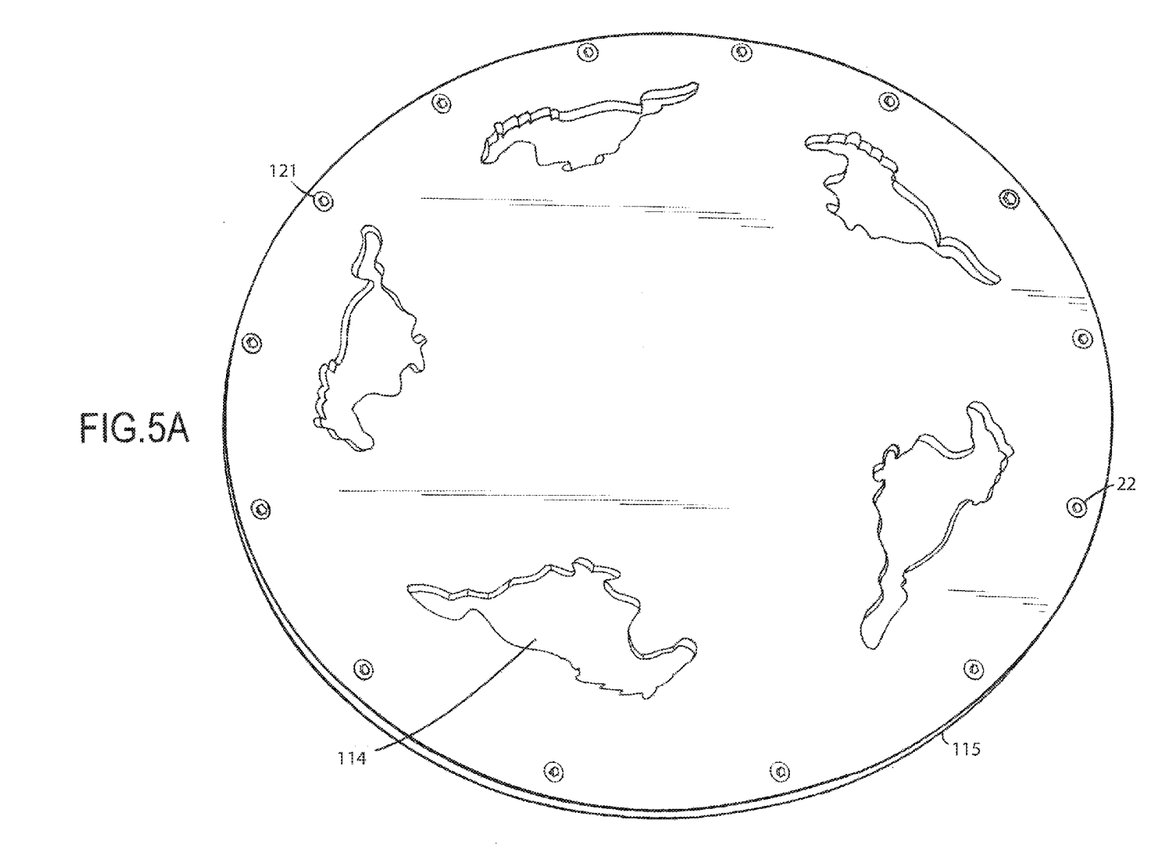
FIG. 5A shows a front plate (disc) 115 wherein the apertures 114 depict a running horse and contain alternating holes 21 and 22.
Figure 6:
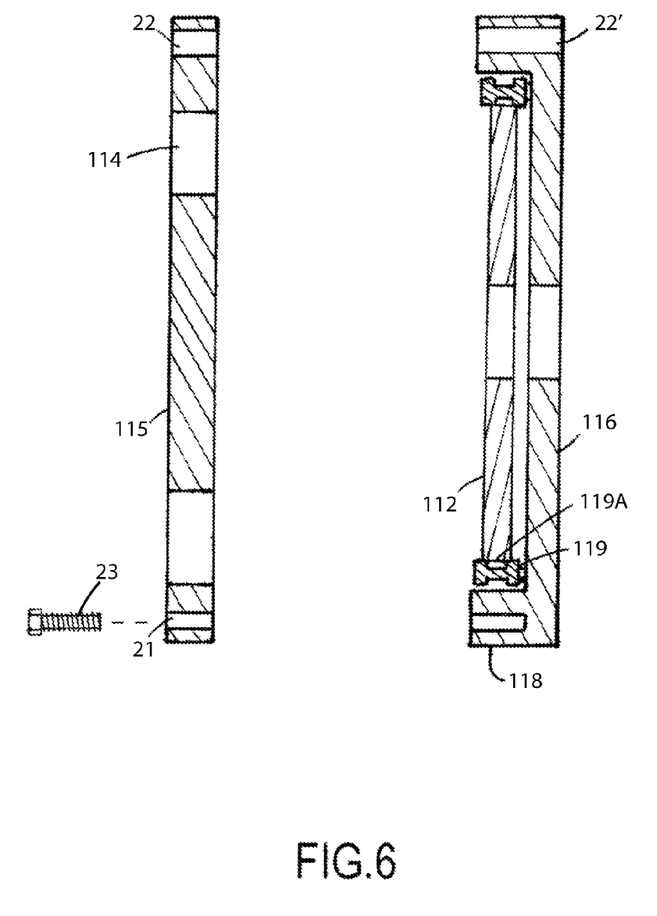
FIG. 6 is a partial cross section side view of the embodiment of FIGS. 5 and 5A wherein the front plate (disk) 115 is detached from the back ring 116 and the spinning ring 112.

In the embodiment shown in FIGS. 5 through 6 at least the front ring of the spinning device comprises a front plate (disk) 115 having the decorative apertures 114 but not the centrally located hole 50 shown in FIGS. 1-4. Also in this embodiment the bearings 119 having groove 119A are placed in the housing on the outer periphery of the back ring so that the spinning ring 112 is supported along the outer periphery (circumference) of the spinning ring.

Figure 1:
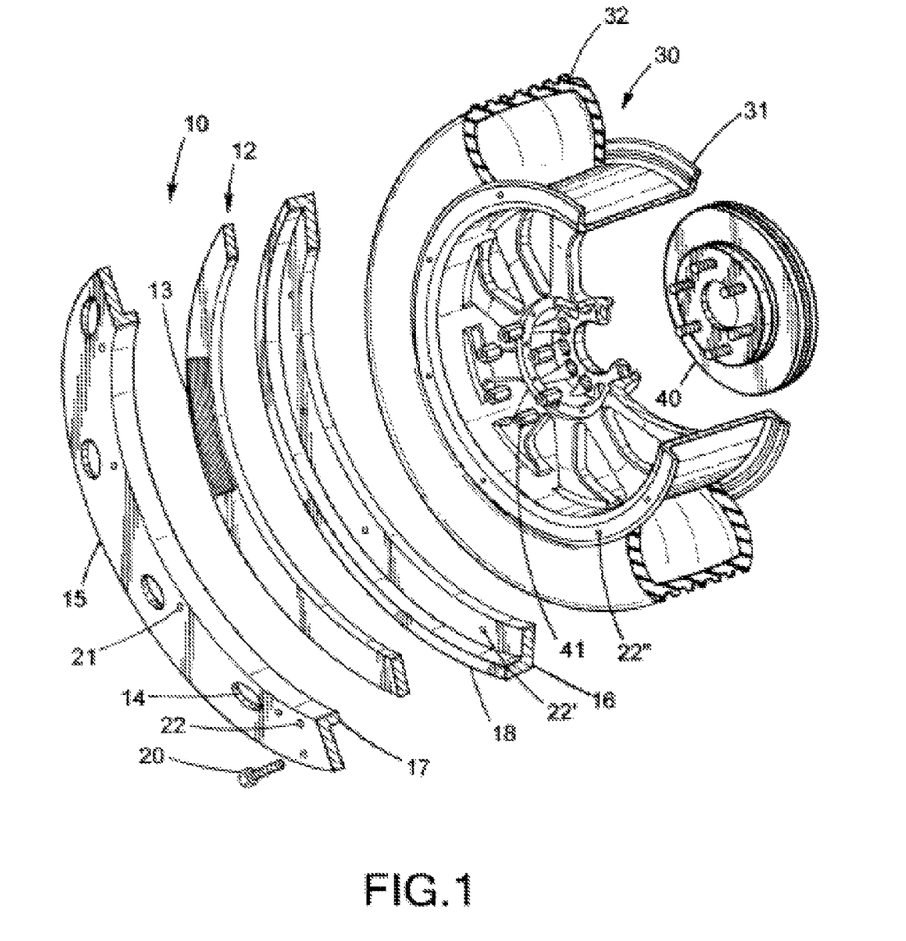
FIG. 1 is a partial isometric cross sectioned exploded view of an embodiment of the spinning device 10 mounted on an automotive wheel wherein the spinning device is sized to hide a portion of the tire 32 and leave open to view a major portion of the wheel.

FIG. 1 shows one embodiment of invention for the wheel spinning device 10 associated with an automotive wheel 31 and tire 32, taken together referred to as 30 in the FIG. 1. This embodiment is comprised of a back ring 16, a front ring 15 with decorative holes 14 positioned therein. Positioned between the back ring and the front ring is a spinning flat ring, 12 that has at least one portion of the front face thereof a contrasting color 13. Interposed between the front and back plates are two spacers an inner spacer 17, and an outer spacer 18. As shown the spacers can be formed from continuous rings and be formed as part of the front and back rings. They can also be formed of individual parts that are spaced from one another and secured around the inner faces of the front and back rings. The spinning ring 12 is rotatably fitted in the housing such that its outer diameter (periphery) does not touch the outer spacer 18 and its inner diameter sits on bearings 19 that are secured around the inner spacer 17. The spinning ring 12 should not touch the inner surfaces of the front and back rings. When the device is assembled it forms a housing 11 with the spinning ring 12 located in the interior (See FIG. 2). The inner diameter of the spinner sits on bearings 19 so that it can spin (rotate) independently of the housing and the wheel. The housing is fixed to the wheel and rotates with the wheel. Preferably the spinning device is removable from the wheel to facilitate tire changes and the like.

The back ring, front ring and rotatable spinning ring are designed to be assembled into a unit in a manner that the rotatable spinning ring 12 starts to rotate when the wheel is rotating and continues to rotate for a time when the wheel stops.

Figure 8:
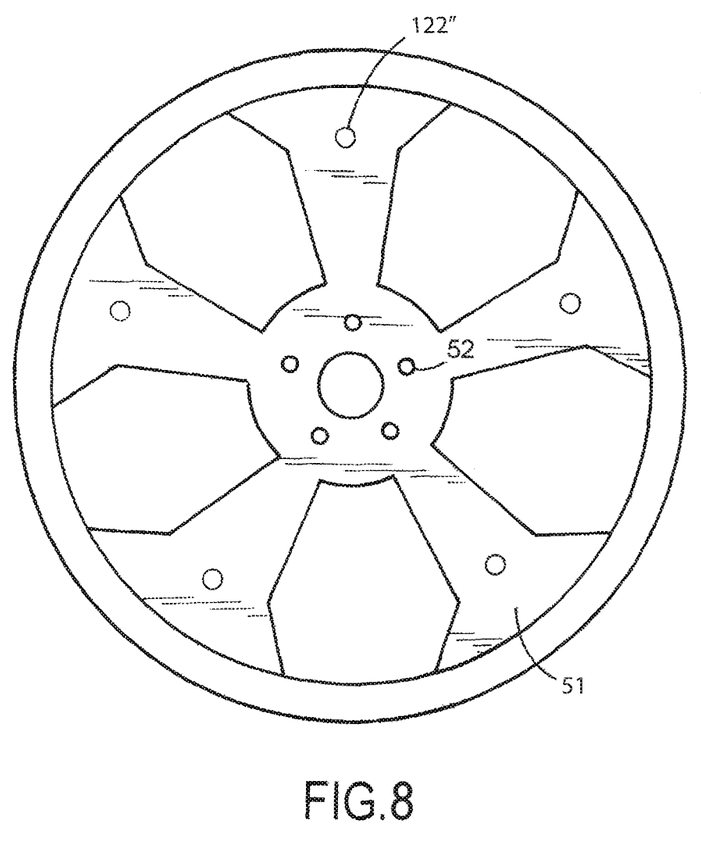
FIG. 8 shows a front view of a wheel designed to permit the housing 11 to be bolted to the wheel with the bolt holes 122" being formed in the spokes 51.

The spinning device 10 is mounted onto a wheel, in this embodiment by the use of bolts 20 that pass through the front ring and back ring through holes 22 and 22' and attach to the rim at threaded locations 22" that align with the holes going through the housing. Other means of fastening the device to the rim can be employed such as with spring clips and the like. An example of a suitable wheel is shown in FIG. 8 with spokes 51 containing bolt holes 22" for attaching, with for example torsion bolts. Also are shown lug stem holes 52.

In the embodiments shown in FIG. 1 and FIG. 3 the dimensions of the spinning device 10 are such that it covers (hides) a portion of the tire and a minimal portion of the wheel. In other embodiments as shown in FIG. 4 for example, the spinning device may only cover a portion of the wheel or in another embodiment, not shown, a portion of both the wheel and the tire. In the embodiment shown in FIGS. 5, 5A and 6 the front plate (disk) ring is closed except for the decorative apertures and the holes 21 and 22 such that the major portion of the front of the wheel is hidden from view.

The embodiments shown in the FIG. 1-6 show the housing and the front, spinning and back rings as being flat. However, at least the front ring can be convex, concave or flat shaped. If desired the three rings, front, spinning and back, can be concave, convex or flat shaped. Different shapes add ascetic variations and also find usefulness on different styles and shaped wheels.

The wheel assembly is provided with conventional brake rotor 40 and lug nuts 41 that are standard in the automotive industry.

FIGS. 5, 5A and 6 show an alternative embodiment. In this embodiment only one outer spacer 118 is provided and is located on and formed as an integral part of the outer periphery of the back ring 116. Also the front plate (disk) only contains decorative apertures 114 and holes 121 and 122' and not the central open hole 50 shown in FIGS. 1-4. Also the spinning ring 112 is mounted on bearings 119 having groove 119A located around the outer periphery of the back ring 116.

The spinning device of the invention can be formed of any suitable material that spinners are normally made of, such as steel, die cast iron, aluminum (and alloys thereof), die cast zinc and the like. They can be chromed or painted to suit the particular vehicle that they will be used with. In a preferred embodiment the housing and spinning ring as well as the spacers are made from aluminum.

The wheel 31 can be of any standard design, solid, spokes, wire wheels or he like as long as it is provided with the threaded holes 22" to fit the bolts of the spinning device of the invention. As previously mentioned clips or other forms of attachment of the spinning device to the wheel can be used as long as it does not interfere with the spinning of the spinning ring 12. FIG. 8 illustrates an example of the front of a wheel where the bolt holes 22" are located in the spokes 51 of the wheel.

Figure 2:
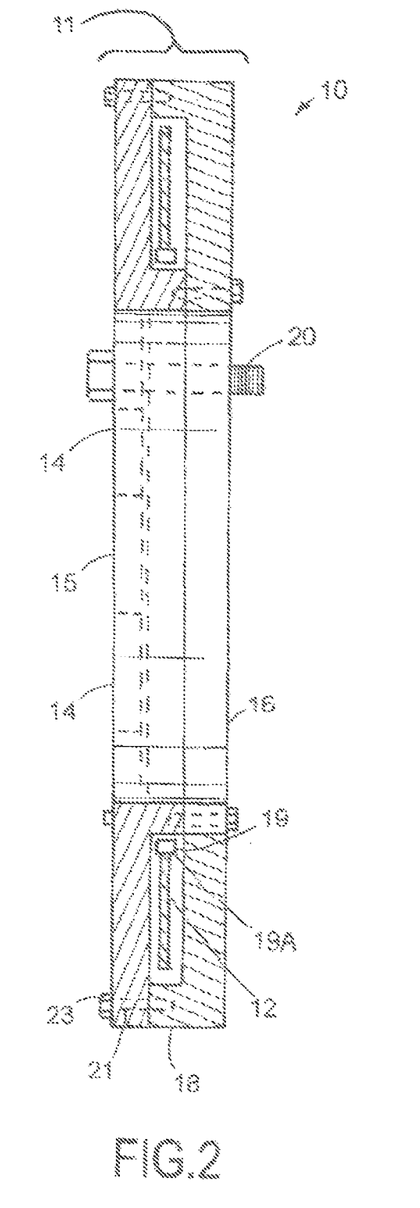
FIG. 2 is a cross-sectional side view of the embodiment of the spinning device 10 taken along an arbitrary centerline.

As shown in FIG. 2 bearings 19, are secured around the inner spacer 17. In the embodiment shown in FIGS. 5 and 6 the bearings are secured in the outer periphery of the back ring of the housing such that the outer periphery circumference of spinning ring 112 is rotatably mounted on the bearings such as by fitting on the groove 119A of the bearings. The spinner bearings 19 are preferably ball bearings as are known in the art. Idler bearings where the outer ring rotates and the inner ring is stationary are suitable. These bearings are available on the market and can be bolted or otherwise affixed, such as by bolting, to either the front ring or the back ring. Preferably at least four idler bearings are equally spaced around the front or back ring on a circumference that permits the inner circumference of a spinning ring having a centrally located hole as is FIG. 2, or the outer circumference as shown in FIGS. 5 and 6 to sit in the groove 119A of each bearing 119 so as to support and allow the spinning ring to rotate. Generally there is sufficient friction in these bearings to cause the spinning ring to start to rotate when the wheel rotates and then there is sufficient momentum in the spinning ring to continue to rotate for a time after the wheel stops rotating. Bearings having a very low friction are preferred. The bearings in this embodiment contain a groove 19A which provides a place for the inner or outer circumference, or both, of the spinning ring 12 to securely rest and be maintained in alignment so as not to touch or rub on the inner surfaces of the housing. The inner or outer circumference of the spinning ring 12 is fitted to the bearings in a manner to allow it to freely rotate in the housing without touching any of the inner surfaces of the housing except for the bearings.

The housing 11 is held together by any suitable fastening means. It can be welded or for example held together with fasteners such as threaded screws 23, FIGS. 2 and 6, which fit through holes 21, provided in the front and back rings. Rivets can also be used. The device can also be held together with adhesives and or welded.

The spinning device 10 can be made essentially weather resistant by providing a weather tight closed housing. O-rings can be provided between the contacting surfaces of the front and back rings and surfaces of the spacers. The apertures 14 in the front ring can be sealed with the use of a clear plastic such as a polycarbonate so the contrasting color 13 on the ring 13 will still show through.

Figure 7:
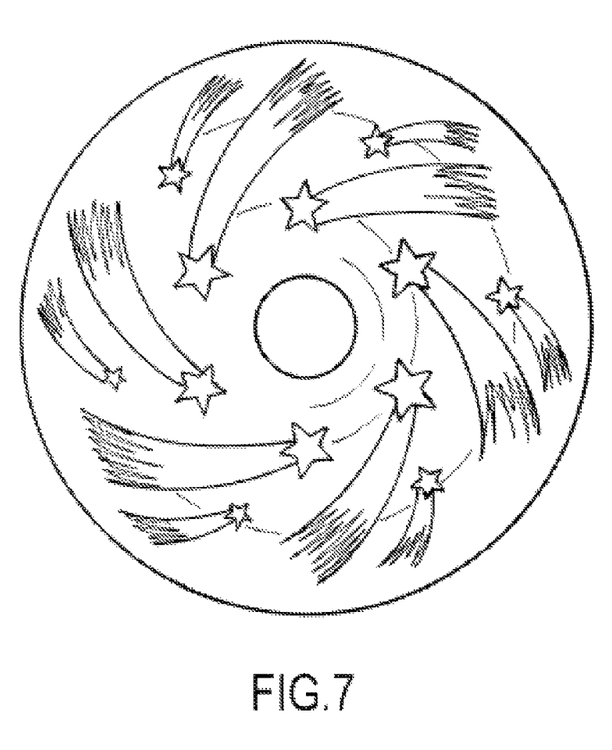
FIGS. 7, 7A and 7B show front rings having different decorative apertures formed therein and the shape of the rings is convex, concave and flat.
Figure 7A:
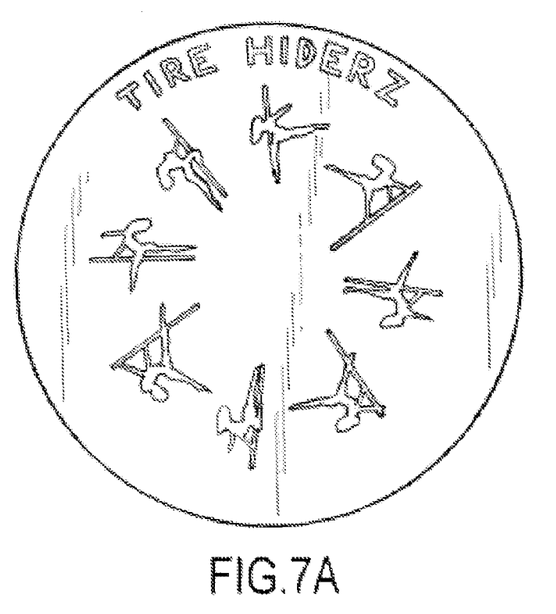
Figure 7B:
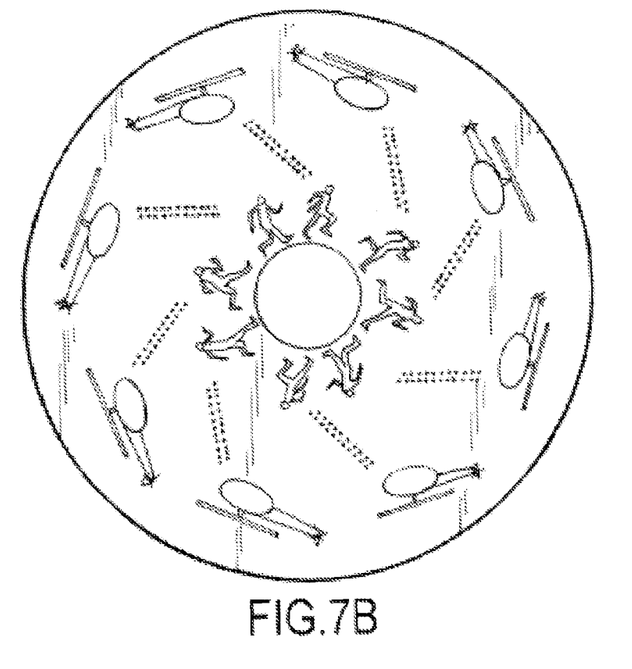
Figure 9:
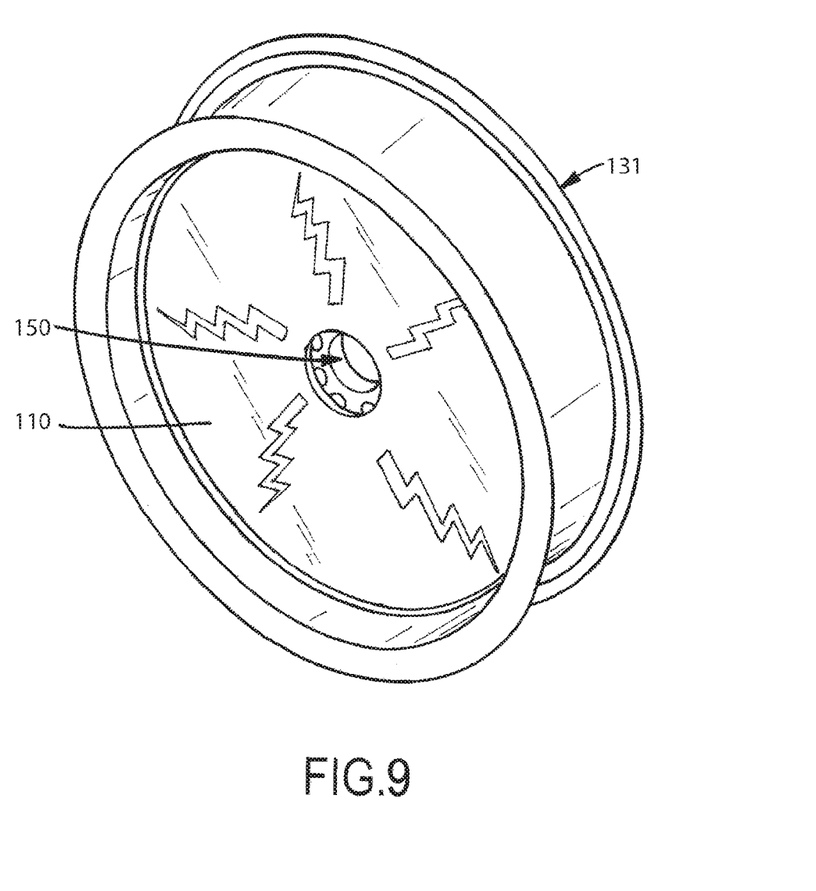
FIG. 9 shows an isometric of a wheel 131 with the spinning device 110 attached and having a center hole 150.

The apertures 14 can be of any desired design. For example they can be formed of letters that spell a name (FIG. 7A). A stick man can be shown in different positions so that when the ring spins the man appears to be running or walking (FIG. 7B). They can be formed of lightning bolts. FIG. 9, or shooting stars (FIG. 7) so that the bolt or stars appear to be moving. Other designs such as shown in FIG. 7B (helicopters) can be used. FIG. 7 shows a slightly curved front ring (convex) having a centrally located hole. FIG. 7A shows a flat shaped front ring which does not contain a centrally hole 50. FIG. 7B shows a flat shaped front ring having a centrally located hole 50. Holes 21 and 22 in the front ring (22' in the back ring) can be alternating but can be placed in different locations so as to close the housing and attach the housing to various wheel designs.

While the invention has been described in complete detail and pictorially shown in the accompanying drawings, it is not to be limited to such details, since many changes and modifications may be made to the invention without departing from the spirit and scope thereof Hence, it is described to cover any and all modifications and forms which may come within the language and scope of the appended claims.

What is claimed is:

1. A spinning device adapted to be attached to the front of a vehicle wheel comprising:
   a housing having a front and a back ring, said back ring having an outer periphery, forming a cavity therein,
   the front ring containing at least one decorative aperture formed therein,
   a flat spinning ring having a front surface mounted within the cavity of the housing in a manner that when the housing is attached to said wheel the spinning ring rotates upon rotation of the wheel and continues to rotate for a time after the wheel stops, and
   said front surface of the spinning ring facing the front ring of said housing having one section of a contrasting color to the remainder of the spinning ring such that when it rotates the colors showing through said aperture change during rotation of the spinning ring.

2. The spinning device of claim 1 wherein said front ring, said back ring and said spinning ring all have a centrally located hole of a size that at least a portion of the wheel shows through.

3. The spinning device of claim 2 wherein the vehicle wheel is a motorcycle wheel.

4. The spinning device of claim 1 wherein the spinning ring has a hole centrally located therein and the device includes bearings upon which the inner or outer circumference of said spinning ring rest so that the spinning ring is capable of spinning upon the rotation of the wheel and continue to spin for a time after the wheel stops rotating.

5. The spinning device of claim 4 wherein the bearings are idler bearings that are affixed to the front ring or to the back ring.

6. The spinning device of claim 1 wherein said housing comprises said front ring and said back ring and separating said front ring and back ring from each other with at least one spacer to provide said cavity.

7. The spinning device of claim 6 wherein the spacer comprises a ring located around the outer periphery of the back ring.

8. The spinning device of claim 1 wherein said housing is weather resistant.

9. The spinning device of claim 1 wherein said front ring has a series of said decorative apertures formed therein.

10. The spinning device of claim 1 wherein there is more than one said aperture in the form of shooting stars.

11. The spinning device of claim 1 wherein there is more than one said aperture that spells out a word.

12. The spinning ring of claim 1 wherein there is more than one said aperture in the form of lightning bolts.

13. A spinning device adapted to be attached to the front of a vehicle wheel comprising:
a housing having a front plate and a back ring having an outer periphery forming a cavity therein,
the front plate containing a series of decorative aperture formed therein;
a flat spinning ring having a front surface and an outer circumference mounted within the cavity of the housing in a manner that when the housing is attached to said wheel the spinning ring rotates upon rotation of the wheel and continues to rotate for a time after the wheel stops, and
said front surface of the spinning ring facing the front plate of said housing having one section of a contrasting color to the remainder of the spinning ring such that when it rotates the colors showing through said apertures change during rotation of the spinning ring.

14. The spinning device of claim 13 wherein:
the back ring has a spacer ring located around the outer periphery thereof, and
the device contains bearings located inside the cavity attached around the outer periphery of said back ring, and the spinning ring is mounted on said bearings around the outer circumference of said spinning ring.

15. A spinning device vehicle wheel combination comprising;
said vehicle wheel and attached to the front of said vehicle wheel the spinning device as defined in claim 13.

* * * * *